Dec. 19, 1922.
C. E. ROGERS.
YARN REEL.
FILED SEPT. 26, 1921.
1,439,330.
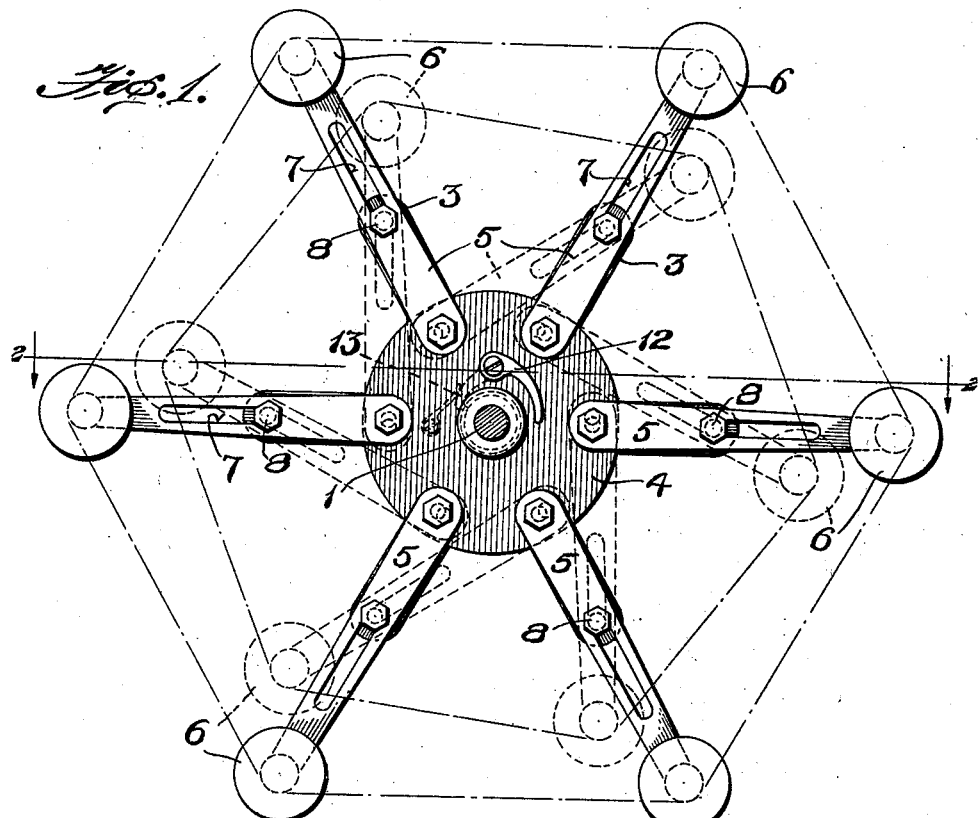
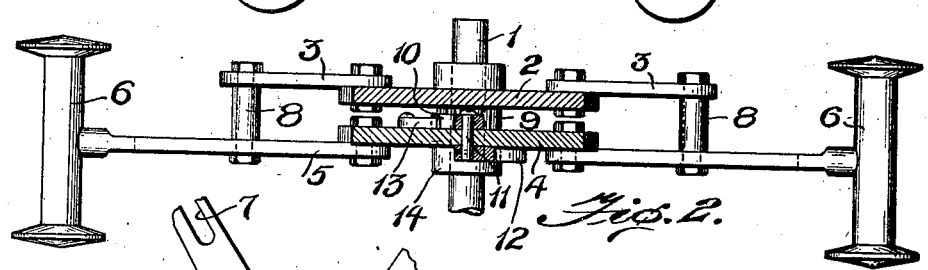
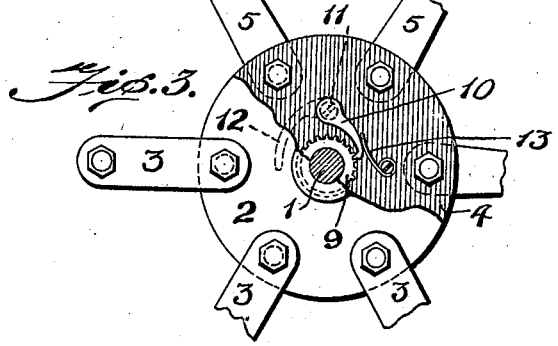

Patented Dec. 19, 1922.

1,439,330

UNITED STATES PATENT OFFICE.

CHARLES E. ROGERS, OF NEW LONDON, CONNECTICUT.

YARN REEL.

Application filed September 26, 1921. Serial No. 503,257.

*To all whom it may concern:*

Be it known that I, CHARLES E. ROGERS, a citizen of the United States, residing at New London, in the county of New London and State of Connecticut, have invented new and useful Improvements in Yarn Reels, of which the following is a specification.

This invention relates to certain new and useful improvements in yarn reels and pertains more particularly to reels of the expansible type.

The primary object of the invention is to provide a reel which has means for enabling the effective diameter or circumference of the reel to be easily and quickly varied as desired; to provide means for positively locking the parts in adjusted position and to generally improve and simplify the construction of reels of this type.

The invention further aims to provide a reel which is equally balanced in all adjustments thereof and one in which mere relative rotation of two parts is required in order to effect the adjustment.

Further and other objects will be later set forth and manifested in the course of the following description.

In the drawings:

Figure 1, is a side elevation of the invention, the supporting shaft being shown in section;

Figure 2, is a section on line 2—2 of Figure 1;

Figure 3, is a detail view partly broken away and in section, and

Figure 4, is a detail perspective view of the locking pawl.

In proceeding in accordance with the present invention, a supporting shaft 1, is employed upon which is rigidly fixed a disk 2 having radial links 3 secured at one end thereto. A second disk 4 is rotatably mounted on the shaft 1 and has arms 5 pivoted at their inner ends thereto, the outer ends of the arms carrying spools 6 and being slotted at 7. Connecting bolts or the like 8 are secured to the outer ends of the links 3 and extend loosely through the slots 7. A locking pinion 9 is rigidly affixed to shaft 1, and is disposed between the two disks 2 and 4. A latch 10 is rigidly carried on one end of a pin 11, the latter extending through the disk 4 and has an operating handle 12, secured on its outer end. The latch 10 engages the teeth of the pinion 9 and is normally held thereagainst by a spring 13. A collar 14 is fixed on the shaft 1 and holds the disk 4 against outward movement.

In operation, when it is desired to adjust the reel circumference, the handle 12 of the latch is moved to raise pawl 10 out of engagement with the pinion 9, whereupon the disk 4 is given a partial turn and since the disk 2 remains stationary, the links 3 which are secured thereto, will, through the bolts 8, cause the arms 5 to move about their pivots on disk 4, the bolts moving along the lengths of the slots 7, thereby bringing the spools 6 closer to or further from the disks, according to the direction in which the disk 4 is turned. Following the desired circumference being attained, the latch is released and engaged with the pinion 9, holding the disk 4 fixed.

Having thus described my invention, what I claim as new and desire to secure by Letters Patent is:—

1. In a reel, a pair of relatively rotatable disks, spool-carrying arms having slots pivoted at their inner ends to one of the disks, links rigidly carried by the other disk and having bolts slidingly engaged in the slots of the arms to move the latter about their pivots, a pinion between the disks, and a latch carried by the first named disk and engaged with the pinion.

2. In a reel, a pair of relatively rotatable disks, spool-carrying arms having slots between their ends pivoted at their inner ends to one of the disks, members rigidly carried by the other disk and having projections slidingly engaged in the slots of the arms to move the latter about their pivots, and means to latch the disks against relative rotation.

3. In a reel, a pair of relatively rotatable disks, spool-carrying arms pivoted at one end to one disk, means carried by the other disk and engaging the arms between the ends of the latter for moving same about their pivots upon relative rotation of the disks, and means to hold the disks against relative rotation.

4. In a reel, a pair of relatively rotatable disks, spool-carrying arms pivoted at one end to one disk, means carried by the other disk and engaging the arms between their ends for moving same about their pivots upon relative turning of the disks, means between the disks to hold same against rotation, and means for operating the last named means to release same arranged exteriorly of one of the disks.

5. In a reel, a pair of relatively rotatable members, yarn engaging means carried by one member, means carried by the other member for moving the yarn engaging means towards or away from said members, a ratchet rigidly related to the stationary member and disposed between the pair of members, a spring tensioned pawl pivotally carried by the rotatable member and disposed between the pair of members and engaging the ratchet to lock the members against rotation, and means located exteriorly of the rotatable member to actuate the pawl to release same from engagement with the ratchet.

6. In a reel, a pair of relatively rotatable members, yarn engaging means carried by one member, means carried by the other member for moving the yarn engaging means towards or away from said members, a ratchet disposed between the members and connected to the stationary member, a spring pressed pawl engaged with the ratchet and disposed between the members, a pin carried by the rotatable member and having the pawl affixed thereto, and a member connected to the pin for operating the pawl to release the latter and located exteriorly of the rotatable member.

In testimony whereof I have signed my name to this specification in the presence of two subscribing witnesses.

CHARLES E. ROGERS.

Witnesses:
MARION A. KINGSLEY,
J. A. MILLER.